Patented Jan. 5, 1932

1,839,191

UNITED STATES PATENT OFFICE

OTTO AMBROS AND ROBERT GRIESSBACH, OF LUDWIGSHAFEN-ON-THE-RHINE, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

PRODUCTION OF RUBBER FROM RUBBER LATEX

No Drawing. Application filed March 21, 1928, Serial No. 263,586, and in Germany March 23, 1927.

This invention relates to the production of rubber from natural latices.

The manner in which raw rubber is obtained from rubber latex is of the utmost importance as regards the properties of the raw rubber produced. The method of recovery is either by smoke, in which case both heat and the presence of weak acids contribute to the precipitation, or by coagulation by an addition of acids or substances having a similar action.

Compared with the natural coagulation of the latex after it has left the lactiferous vessels in the plant, these artificial coagulation processes constitute a rather rough chemical treatment of the latex.

We have now found that the coagulation may be effected just as quickly as by the processes already known but in a harmless manner by treating the latex with highly active proteases. Latex which has been stabilized with ammonia or any other known stabilizer may also be coagulated in this manner, if the stabilizer, for example, ammonia be wholly or partially eliminated in any known manner, such as by an air blast or by neutralization. Such highly active proteases have the advantage of coagulating the latex in the course of a few hours at the most, thus avoiding the putrefaction of the latter, which occurs in coagulations taking a day or so. In this way strong stringy products are obtained, free from bubbles.

Suitable active proteases are, for example, the proteases found in succus caricæ papayæ.

According to the amount and kind of the highly active protease employed, the coagulation may be effected in different ways, both as regards time and also from the chemical point of view, and it is thus possible to obtain various kinds of rubber from the latex.

Further modifications in the result may be obtained by the use of additions, and especially specific substances enhancing the activity of the proteases, such as hydrocyanic acid. In this case proteases, which are not highly active may also be employed.

The particular advantage of the method of working according to this invention resides in the fact that the valuable associates of the rubber are also precipitated from the latex and that substantialy neutral products are obtained. A further improvement resides in that washing can be dispensed with, which is a very troublesome operation but necessary when the products are precipitated with acids, because acid residues are the cause of rubber becoming tacky and glutinous.

According to this invention, for example, sinewy white rubber products are obtained from Hevea brasiliensis, which possess excellent properties.

The properties of the rubber can be further improved in a controllable manner by imparting to the latex, prior to the addition of the porteases, such a degree of hydrogen-ion concentration that the coagulation is accelerated or retarded thereby. For example by adjusting a pH rising from 7 for example to about 8 or more, the coagulation of the latex may be retarded in any desired degree, and on the other hand by adjusting a pH decreasing down to about 6, the coagulation may be accelerated as desired. As a rule it will be more advantageous to retard the coagulation. In this manner, different grades of rubber may be obtained, the properties of which can be varied within wide limits in acordance with the object in view, as for example, for the production of articles of very strong soft rubber, or of dense hard rubber and the like.

In some cases a slightly acid reaction of the added agent is of importance having regard to the quality and stability of the products to be obtained. It has also been found that when the operation is conducted in the presence of saline mixtures possessing buffer properties especially such as citrates or similar compounds, particularly valuable products are obtained which even in the unvulcanized condition, offer a marked resistance to the known tendency of rubber to form viscous, glutinous substances.

The following examples will further illustrate the nature of the said invention which however is not limited thereto.

*Example 1*

Air, preferably warmed, is passed through rubber latex, which has been mixed with ammonia to prevent the gradual natural coagulation, until the latex has acquired a nearly neutral reaction. In this condition it is still stable, and coagulation does not take place, at ordinary temperature, until after the lapse of several days.

10 litres of this freshly prepared, almost neutral latex are stirred up with a solution of 5 grams of succus caricæ papayæ in 100 cubic centimetres of water, and maintained at 30° C. After a few hours, a white, neutral gel separates out, and when passed through the washing rollers, furnishes a highly elastic raw rubber.

If the activity of the protease be enhanced, as for example by the addition of a dilute solution of hydrocyanic acid, the time required for coagulation is reduced to about $\frac{1}{10}$ of that required to separate the raw rubber without the said addition. The activity may be enhanced for example in the following manner. 100 cubic centimetres of the said 5 per cent solution of succus caricæ papayæ are treated with 60 milligrams of hydrocyanic acid prepared by decomposing a solution of potassium cyanide with hydrochloric acid and left still for a few minutes. 100 grams of this activated solution of succus caricæ papayæ added to 10 litres of latex will precipitate a raw rubber of excellent qualities in a very short time.

*Example 2*

By passing air through latex stabilized with ammonia, so much of the latter is removed as to impart to the latex a hydrogen-ion concentration of about pH=8.0.

100 cubic centimetres of a 2 per cent solution of succus caricæ papayæ are added to 5 litres of the pretreated latex. After about 20 hours a dense coagulated product separates out; if the efficiency of the coagulant be enhanced by an addition of hydrocyanic acid the time of coagulation is shortened to about 7 hours.

If the hydrogen-ion concentration be higher, for example pH=6.0, the time of coagulation is shortened to about 2 hours under the same conditions of working and using the ordinary solution of succus caricæ papayæ; if the efficiency of the latter be enhanced the time required for coagulation is shortened to even a few minutes.

The properties of the rubber obtained under the various conditions described are different, so that different kinds of raw rubber of valuable properties which are variable at will, within wide limits, may be obtained from a certain latex.

What we claim is:

1. The process for the production of rubber from latex, which comprises coagulating the latex by means of an active protease in the presence of mixtures possessing buffer properties.

2. The process for the production of rubber from latex, which comprises coagulating latex by means of active proteases in the presence of saline mixtures possessing buffer properties and weak acidity.

3. The process for the production of rubber from latex, which comprises coagulating the latex by means of proteases rendered highly active by an addition of hydrocyanic acid.

4. The process for the production of rubber from latex, which comprises coagulating the latex by means of succus caricæ papayæ containing an addition of hydrocyanic acid.

5. A process for the production of rubber from latex which comprises coagulating the latex by means of a highly active protease.

6. A process for the production of rubber from stabilized latex which comprises removing at least part of the stabilizer from the said latex and coagulating by means of a highly active protease.

7. A process for the production of rubber from latex stabilized by ammonia which comprises removing at least part of the ammonia from the said latex and coagulating by means of a highly active protease.

8. A process for the production of rubber from latex which comprises coagulating the said latex with an active protease in the presence of a substance enhancing the activity of the protease.

9. A process for the production of rubber from latex which comprises coagulating the said latex with an active protease in the presence of hydrocyanic acid.

10. A process for the production of rubber from latex, which comprises coagulating the said latex with an active protease in the presence of a substance enhancing the activity of the protease and of a buffer substance.

11. A process for the production of rubber from latex, which comprises coagulating the said latex with an active protease in the presence of hydrocyanic acid and a buffer substance.

12. A process for the production of rubber from latex, which comprises imparting to the latex a hydrogen-ion concentration influencing the rate of coagulation, adding a protease and a substance increasing the activity of the protease, and coagulating the latex.

13. A process for the production of rubber from latex, which comprises imparting to the latex a hydrogen-ion concentration of from pH=7 to pH=8, thus retarding the rate of coagulation, adding a protease and a substance increasing the activity of the protease, and coagulating the latex.

In testimony whereof we have hereunto set our hands.

OTTO AMBROS.
ROBERT GRIESSBACH.